June 24, 1930.  L. ROUANET  1,766,309
BRAKE OPERATING DEVICE FOR MOTOR VEHICLES
Original Filed March 9, 1925  2 Sheets-Sheet 1
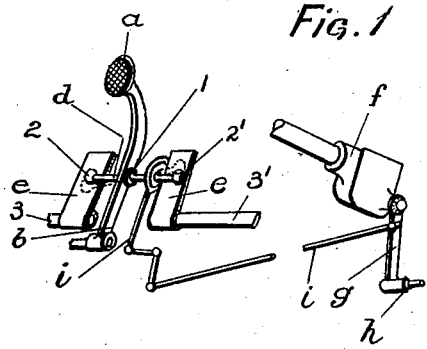
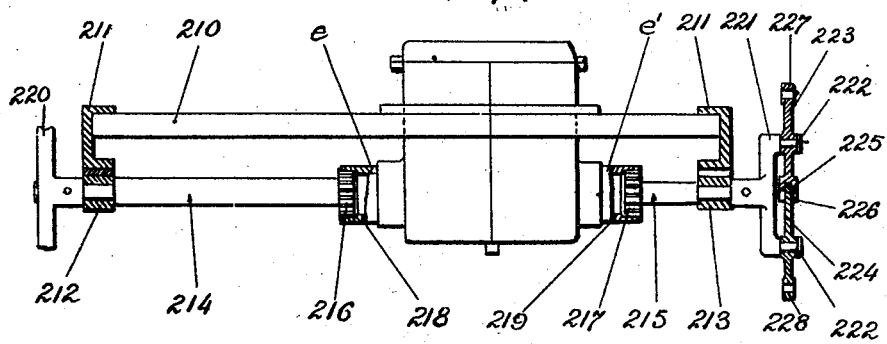
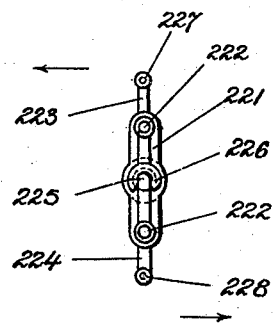
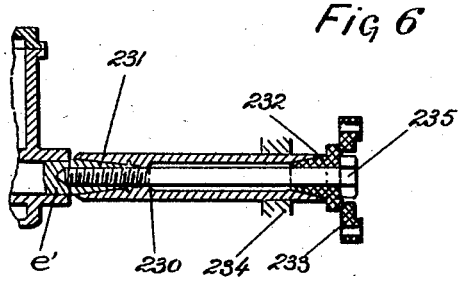
L. Rouanet
INVENTOR
By Marks & Clark
ATTYS June 24, 1930.   L. ROUANET   1,766,309
BRAKE OPERATING DEVICE FOR MOTOR VEHICLES
Original Filed March 9, 1925   2 Sheets-Sheet 2
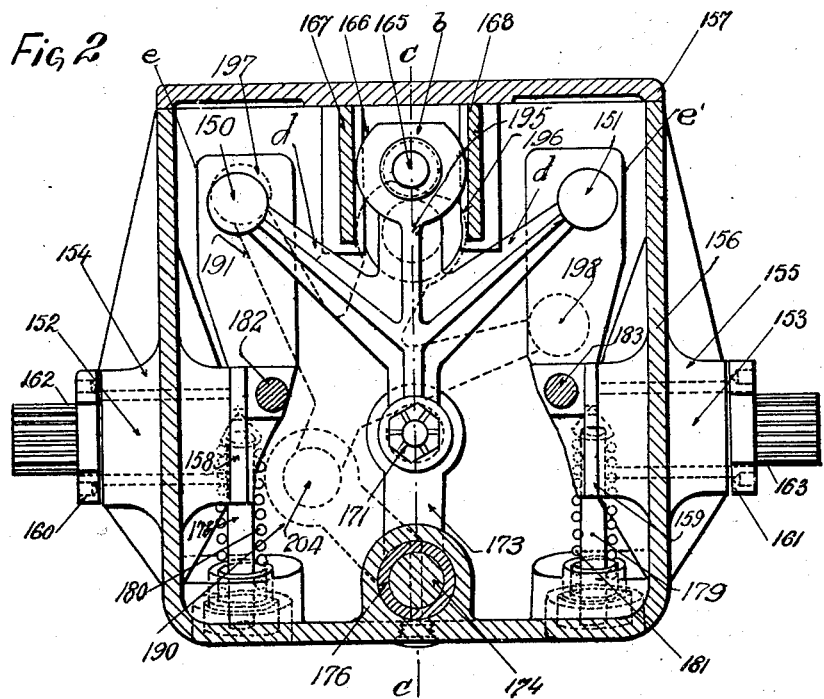
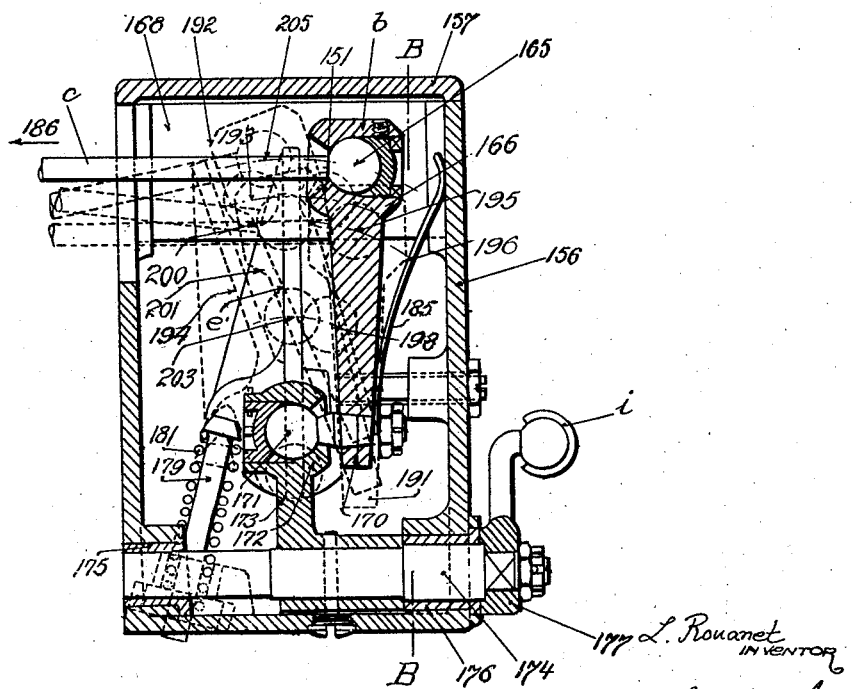

Patented June 24, 1930

1,766,309

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY

BRAKE-OPERATING DEVICE FOR MOTOR VEHICLES

Original application filed March 9, 1925, Serial No. 14,255, and in France March 21, 1924. Divided and this application filed December 14, 1927. Serial No. 240,015.

The present invention relates to a brake operating device, which is applicable to all known brake systems for steering and driving axles, and which effects automatically an equal distribution of the braking force or action applied to each of the steering and driving wheels during the running of the vehicle in a straight line, as well as a differential division of this force when the vehicle traverses a curve.

The said device, in which the initial action producing the braking movement acts, under the control of the steering mechanism of the vehicle, on a special arrangement by which it is suitably distributed upon each of the wheels, comprises in combination: a primary member receiving the brake pull from a pedal, a lever, an auxiliary motor, etc.; two secondary members transmitting the brake pull to the wheels or to groups of wheels; and a intermediate member which, under certain conditions, divides the brake pull received from the primary member between the secondary members.

The conditions of distribution, controlled by the steering mechanism of the vehicle, may be modified by the displacement of one of the constituent members of the special arrangement, such member being either the intermediate member, or the primary member receiving the brake pull, or also the secondary members.

The system may be arranged in various ways, so that the effect of the steering movements will act: either to distribute the braking force, differentially on each of the secondary members, or to reduce the action upon one of the secondary members, or also to reduce the action on each of the secondary members, the distribution in this latter case being equal or different on each of the said members.

This application is a division of my copending application Serial No. 14,255, filed March 9, 1925.

The invention will be better understood with reference to the accompanying drawings, annexed as examples, and in which:

Fig. 1 is a perspective diagrammatic view of an arrangement according to which the conditions of distribution of the braking force may be modified by moving the intermediate member;

Fig. 2 is a sectional view, on line B—B of Fig. 3; of an apparatus in which the braking action is reduced on one of the secondary members, without increase on the other while the vehicle is running along a curve.

Fig. 3 is a cross section on line C—C Fig. 2;

Fig. 4 is a view in elevation showing one method of assembly of a distributing casing on the underframe of a vehicle;

Fig. 5 is a side view of the auxiliary balancing device illustrated Fig. 4.

Fig. 6 is a longitudinal sectional detail of an alternative form of assembly.

In the drawings, $a$ designates the member which is acted upon to operate the brakes. $b$ designates the primary member which may be either formed integral with the member $a$ or independent from said member but controlled through the latter by means of any suitable member $c$. $d$ designates the intermediate distributing member, acting as a beam on the secondary members $e$ through which the brake force is transmitted.

$f$ designates the steering device of the vehicle and $g$ the steering lever which control the steering movements of the wheels through the intermediary of a steering member $h$, and, through the intermediary of a rod $i$, provides for the modification of the division of the braking force, by acting on the intermediate distributing member $d$.

In Fig. 1, the intermediate distributing member $d$, which is connected by a knuckle 1 to the primary member $b$, is provided at each of its ends with a spherical extension, 2 and $2^1$, through which it operates conveniently the two secondary members $e$—$e$, in spite of the small relative angular displacements which may occur in the positions of said members.

When the vehicle is travelling in a straight line, the bearing points of the spherical parts 2 and $2^1$ on the secondary members $e$ and $e$ are situated on a parallel to the pivoting axis 3—$3^1$ of the said members $e$, $e$. The secondary members $e$ oscillate about the axis 3—$3^1$ so that the line of the bearing points of the spherical parts 2, $2^1$ on the members $e$ may become angularly disposed relative to the parallel line above referred to.

In the said angular positions of the intermediate distributing member $d$, one of the spherical parts 2 or $2^1$ is widely spaced from the axis 3—$3^1$, while the other spherical part is conversely situated at a smaller distance from the said axis.

The angular positions are obtained by moving the member $d$ about the knuckle I in a plane substantially parallel to that containing the bearing surfaces of the secondary members $e$.

The operation of this arrangement is as follows:

The braking force applied to member $a$ is automatically equally divided between each of the spherical parts 2 and $2^1$ of the member $d$. The steering rod $i$ is so adjusted that, when the vehicle is travelling in a straight line, and notwithstanding the angular movement of the pedal $a$, the bearing points of the spherical parts 2 and $2^1$ of the member $d$, on the secondary members $e$ rest on a line parallel to the axis 3—$3^1$ (as shown in full lines in Fig. 1).

The braking force being equal on each spherical parts 2 and $2^1$, and the lever arms 3—2 and $3^1$—$2^1$ having the same length, it follows that the action of the secondary members $e$ will be the same.

On curves, and through the intermediary of the steering rod $i$ actuated by the steering lever $g$, the intermediate distributing member $d$ is tilted about its pivotal connection I (as shown in dotted lines Fig. 1) assume an angular position the amount of the angular displacement being obviously proportional to the steering movement.

In any of the angular positions of the member $d$, the action on each of the spherical parts 2 and $2^1$ is always the same, but for a given steering movement, one of the lever arms 3—2 or $3^1$—$2^1$ is elongated, while the other is shortened an equivalent amount, whereby the effect of one of the secondary members $e$ is increased while the effect of the other member is reduced.

By suitably designing the brake rods it may be easily arranged to transmit this increased action to one or other of the groups of wheels of the vehicle.

In the Figs. 2 and 3, illustrating a mechanical arrangement of the distributing device shown in Fig. 1, the primary member $b$, and the intermediate member $d$, are formed as a rigid whole $b$—$d$, in such a manner that the braking force applied to the pedal $a$, or an equivalent lever, and transmitted through the brake rod $c$, will always be equally divided between the two spherical ends 150 and 151 of the part $d$ of the single member $b$—$d$, whatever may be the position occupied by the part $b$ of the said member.

The spherical ends 150 and 151 act respectively on the secondary members $e$ and $c^1$ secured to shafts 152 and 153 journaled in extensions 154 and 155 of a casing 156 closed by a suitable cover 157. The shafts 152 and 153 are laterally guided, on the inner side by collars 158 and 159, and on the outer side, by means of screw threaded rings 160 and 161, and their ends, 162 and 163, are provided with serrations or other suitable engaging means enabling the secondary members to be connected with the brake rods acting on the wheels or on the groups of wheels of the vehicle.

The part $b$, of the member $b$—$d$, which is connected to the rod $c$ by means of a ball and socket joint 165, has a spherical end 166 which slides in a guide formed by the plates 167 and 168 located inside the casing 156 while the other end, 170, has a spherical shape, as shown at 171, and is disposed in a spherical housing 172 as hereafter explained.

The part $b$ is adapted to follow the motion of the rod $c$ by tilting about the spherical end 171, while it is guided in the guides 167—168 of the casing, and, at the same time, it may rotate about an axis passing through the centers of the spherical parts 166 and 171.

The spherical ends 150 and 151, acting as intermediate members, are thus able to rotate freely in accordance with the angular displacement of the secondary members $e$ and $e^1$.

The ball socket 172 forms a part of a crank member 173 secured on a shaft 174 arranged parallel to the guide 167—168 and said shaft may rotate in journals 175 and 176 of the casing 156 and is provided, outside the casing, with a lever 177 suitably connected, by means of the steering rod $i$, to the steering mechanism (not shown).

The secondary members $e$ and $e^1$ are brought back against stops 182 and 183, by means of thrust members 178 and 179 guided into sleeves screwed into the casing 156. Springs 180 and 181 control the operation of the thrust members 178 and 179, and the secondary members, when moved against their respective stops 182 and 183, actuate all the operating and brake members connected to the ends 162 and 163, thus causing the automatic release of the brakes while insuring, at the released position, the constant location, in the same appropriate plane, of the secondary members $e$ and $e^1$. This arrangement which provides for the adjustment of the brakes, by starting from the most convenient position of the secondary members $e$ and $e^1$, prevents any initial angle of lag, which may become added to a predetermined normal angle of lag between the said members $e$ and $e^1$, in order to allow for unavoidable elongations or small differences in the steering rods.

A spring 185, secured to the primary member $b$, bears against the casing 156 and causes the ends 150 and 151 of the member $b$—$d$ to bear against the secondary members $e$ and $e^1$ in the direction of the braking stress.

By this arrangement, combined with the arrangement insuring the return movement of the members $e$ and $e^1$—and provided that the brake pedal acts positively in traction on the rod $c$ (in the direction of the arrow 186) and acts freely in compression on this rod (in the reverse direction of that of the arrow 186)—the ends 150 and 151 remain in contact with the secondary members $e$—$e^1$ when the brakes are released. This prevents noise and play and at the same time ensures the correct location of the arms $d$, which arms remain parallel to $e$ and $e^1$, the latter being forced back, as above indicated, in a plane situated at right angles to the direction of the braking pull.

It will be observed that, the force of the spring 185 is just sufficient to ensure contact between the spherical ends 150 and 151 and the members $e$ and $e^1$, without interfering with the return movement of the latter.

The crank member 173 when moving about the pivotal connection 174, under the influence of the steering movements, moves the primary member $b$ to the right or the left (Fig. 2), in an inclined position relative to the other members, said member $b$ occupying, during movement of the vehicle in a straight line, such a position that the spherical ends 150 and 151 act on the members $e$ and $e^1$ at the same distance from the pivoting axis 152 and 153 (in Fig. 2, the axis passing through the centers of the balls 166 and 171 encounter the pivotal axis 174 for said position).

The right and left hand movements of the member $b$—$d$ are effected without modification in the operation of the said member by reason of the special form of the parts 165, 166 and 171.

All the members are preferably arranged so that, in the released position, any unnecessary movement is avoided, the crank member 173, when the steering wheels are deflected, actuating the primary member $b$, with the ends 150 and 151 forming the intermediate member $d$, in parallel motion relative to the faces of the members $e$ and $e^1$, and, preferably also, in parallel motion relative to the wall of the casing 156 on which bears the spring 185.

Preferably the center of the ball 171 coincides, during movement in a straight line, with the pivoting axes 152 and 153, thus avoiding any sliding movement of the spherical ends 150 and 151 on the members $e$ and $e^1$ during braking while the vehicle is moving in a straight line, such conditions occurring more frequently. The sliding movement produced when applying the brakes while the vehicle is running on curves is of less importance by reason of the small excentricity of the ball member 171.

When all the members are in the tightened position, the movements of the steering mechanism cause the crank member 173 to modify the position of the center of the spherical part 171 of the member $b$, through the intermediary of the member $i$ and the lever 177, the displacement of the said ball 171 taking place, about the shaft 174, along a portion of the circle 190.

The member $b$ assumes inclined positions in one direction or the other, and this results in the distance between one of the spherical ends 150 and 151 and one of the pivoting axes 152 or 153 of the secondary members $e$ and $e^1$ being reduced. The arrangement and sizes of the different members, relatively to one another, are such that when the member $b$—$d$ moves to the right or to the left relative to its position during movement in a straight line of the vehicle, one of the spherical ends 150 or 151 remains practically motionless while the other moves to a position located at a smaller distance from the pivoting axis of the corresponding secondary member.

Owing to this arrangement, the lever arm of the force acting on one of the secondary members remains practically constant, while the lever arm of the force acting on the other secondary member is widely reduced.

When the member $b$—$d$ reaches the position 191 indicated in dotted lines, which corresponds to a movement to the left, it will be seen that the lever arm of the spherical end 150, acting on the secondary member $e$ (Fig. 2), has remained practically the same, while, on the contrary, the lever arm of the spherical end 151, acting on the secondary member $e^1$, is widely reduced.

The position (191) of the member $b$—$d$ may be considered as corresponding to a maximum steering movement, nevertheless, the member $i$ may be so arranged that the maximum steering movement referred to results in a greater angular displacement of the ball member 171. In this case, and beyond a certain angular position the spherical end 150 will move towards the pivoting axis 152, while, at the same time, the distance between the sphere 151 and the pivoting axis 153 continues to decrease, the result being that the leverage should be reduced in the case of one member alone during small steering movements, and for the two members during the steering movements of larger range.

When the displacements of the member $b$—$d$ take place as just indicated, nothing results when the brakes are in the released position, and the resistance introduced by the movements of the various members is of little importance.

When the member $b$—$d$ moves during the application of the brakes, friction is effected between the spherical ends 150 and 151 and the corresponding members $e$ and $e^1$, and also in the ball and socket joints 165, 166 and 171, all said members being established to resist the wear and to oppose small resistance. Further, the water tight casing 156 protects properly the various members, and permits oiling of the same, the total friction being thus of very small value and causing no perceptible interference in the steering of the vehicle.

When the brakes are applied while the vehicle is running on a straight line, the apparatus acts as an ordinary balancing device; the member $b$ rotates about the ball member 171 and, the ball end 166 slides in the guide 167—168, and reaches for example the position shown in dotted lines at 192, while, at the same time, the ball member 165 reaches the position 205 (Fig. 3).

The spherical ends 150 and 151 are moved at 193 by bearing normally against their respective members $e$ and $e^1$, which members reach the position 194 and actuate the brakes. The spherical ends 150 and 151 transmit the braking force equally while oscillating about the axis C—C (Fig. 2) to allow for the angle of lag of the members $e$ and $e^1$ which, during said movements, compress the springs 180 and 181 in moving away from their stops 182 and 183. When the force applied to the pedal is reduced or becomes nil, the springs 180 and 181 act to restore the members $e$ and $e^1$ and the depending brake rods to their initial positions thus ensuring automatic release and permanent contact between the members $e$ and $e^1$ and the spherical ends 150 and 151 for every braking position.

During a steering movement of predetermined direction, the steering mechanism moves for example the ball member 171 into the position indicated by 204 (Fig. 2), causing the member $b$—$d$ to move in the position indicated by 191. The ball member 165 of the rod $c$ moves to the position 195, following the displacements of the spherical end 166 which slides in the guide 167—168 to the position 196.

The spherical member 150, which moves only to a small extent, passes to 197 (this movement being of very small value and indicated only in Fig. 2 and not in Fig. 3), and the spherical end 151 moves to the position 198 by sliding on its member $e^1$.

When, during such steering movement, the brakes are applied the ball member 165, located in the position 195 owing to the steering movement, moves to the position indicated by 200 (Fig. 3) under the action of the brake pull. The spherical end 166, having passed to the position 196 reaches the position 201 by sliding in the guide 167—168; the spherical end 150 moves to the position 193 and the spherical end 151, located in the position 198, moves to 203.

In the drawing it has been indicated that, during an application of the brakes and while on a curve, the spherical end 151 moves to 203 and the spherical end 150 moves to 193, giving a parallel movement to the members $e$ and $e^1$ as shown at 194 (Fig. 3).

In practice, the above described operaiton is slightly different owing to the following facts; the lever arm of the spherical end 151 having been considerably reduced, the braking effect of the secondary member $e^1$ will be reduced accordingly. The brake rod arrangement, as well as the brakes themselves having some resiliency, proportional to the brake pull, the member $e^1$ moves through a smaller angle than the member $e$ of which the braking effect is greater. The result will not be affected by the difference, as the members $b$—$d$ always assume the proper position. Nevertheless it is preferable to avoid such difference because it is well determined and of importance since it results from the differences of force between each of the secondary members. In this manner the complete stroke of the said secondary members may be used to balance the unavoidable varying deformations of adjustment of the brake rod arrangement.

According to the invention, the improved device may be combined with a front axle brake system in which the steering movements cause an angular displacement of the operating levers of the brakes, the brake rods being so disposed, between the said operating levers and the secondary members, that when on a curve, the angular displacement of the operating levers are such, and of such value as to compensate the elongations produced in the rods due to the differences of braking power of the secondary members.

The apparatus described with reference to the Figures 2 and 3 is of particular interest in numerous applications, as, when moving on a curve, it allows the braking effect on the wheels that traverse the arc of greater radius to be reduced and thus avoiding any possibility of skidding, without modification of the braking effect on the wheels that traverse the arc of smaller radius, the braking effect on said latter wheels remaining the same as in straight line for a given pressure on the pedal.

Under such circumstances, the driving of the vehicle is facilitated and the braking strain is automatically transmitted in the best possible manner, without calculation on the part of the driver.

By way of example, the Figures 4 and 5 represent one method of mounting the distributing box on a vehicle frame by securing them to the cross bars 210 which are made integral with the frame 211.

The shafts 214 and 215, having lateral guides, are disposed so as to rotate in journals 212 and 213 supported on the frame. The shafts 214 and 215 are provided with toothed ends 216 and 217, adapted to engage with corresponding toothed portions formed inside the tubular ends 218 and 219 of the secondary members $e$ and $e^1$. This arrangement allowed for a positive coupling, and, at the same time, for angular adjustment while conforming readily to distortions of the underframe of the vehicle. Levers 220 and 221 are secured to the shafts 214 and 215. Pins 222 may be provided at the ends of the levers 220 and 221, said pins serving as pivoting axes for the double levers 223 and 224 connected to one another at one end, for example for means of a finger 225 on the lever 224 sliding in a notch formed in the lever 223. The other ends of the levers 223 and 224, respectively numbered 227 and 228, are connected to the brakes of one of the wheels of a group of wheels by means of suitable brake rods.

Owing to this arrangement, the angular displacement of the shafts 214 and 215, which is caused by the secondary members $e$ and $e^1$, causes a pull on the rods after balance has practically been established between the latter owing to the oscillating movements of the levers 223 and 224 about the pins 222, the finger 225 engaging its notch 226.

This particular arrangement permits the use of rigid brake rods which, in some cases, may advantageously replace the drive bands which require a double lever provided with two rollers around which the said bands pass if they are to function under the same conditions.

In case the distributing box is eccentrically disposed relative to the levers 220 and 221, the longer shaft may have a larger cross section than the shorter one, so as to obtain, when the braking effect of the members $e$ and $e^1$ is the same, the same value of flexion of the shafts 214 and 215 as measured at the points of application of the pulls exerted by the levers 220 and 221 (in the case of Fig. 4, the longer shaft 214 is of greater cross section than the shorter shaft 215).

Fig. 6 indicates an alternative method of assembling the shafts 214 and 215 of Fig. 4. Said shafts are here replaced by a tube 230 having a conical bore at each end. One of the said conical bores, designated by the reference 231, accomodates the conical portion of one of the members $e$ or $e^1$, while the other conical bore, designated by reference 232, accommodates the conical portion of a lever 233. The tube 230 is guided in a bearing 234 supported on the vehicle frame. A screw 235, bearing against the lever 233, and to be screwed up in the secondary member $e$ or $e^1$, connects the said member $e$ or $e^1$ with the lever 233, in the best possible conditions of assembly and accessibility.

Claims—

1. A brake device arrangement including a balancing device comprising a casing, plate shaped secondary brake operating members journaled in the side walls of said casing, a primary member one end of which is slidably mounted in a guide on the casing and the other end of which is pivotally connected to a crank shaped member journaled in the rear wall of the casing an intermediate member formed integral with the primary member and having ball shaped ends bearing on the plate shaped secondary members, resilient thrust members acting on the secondary members and adapted to return same to their positions of rest, a resilient member adapted to hold the ends of the intermediate member in contact with the plate shaped parts of the secondary members, brake operating means adapted to actuate the primary member and means, controlled by the steering mechanism, and adapted to actuate the crank shaped member.

2. In a balancing device according to claim 1, the crank shaped member adapted to move the primary member on either side of its normal position, and the intermediate member adapted to remain practically motionless at one of its ends during the displacements at one side of the primary member, and at the other of its ends during the displacements at the other side of the said primary member.

3. A brake device arrangement comprising in combination a main brake operating member, a primary member connected therewith and operated thereby, an intermediate member and two secondary brake operating members actuated thereby, brake shoes actuating devices, connecting means between the secondary brake operating members and the brake shoes actuating devices including shafts, main levers connected to said shafts and auxiliary levers pivotally mounted at the ends of the main levers, said auxiliary levers adapted to remain in mutual engagement at one of their ends while their other ends are connected to the brake shoes actuating devices, and means controlled by the steering mechanism and adapted to vary continuously the braking pulls transmitted to the said brake shoes actuating devices through the said secondary brake operating members when the front wheels are deflected.

LOUIS ROUANET.